United States Patent

Udagawa

[11] Patent Number: 5,899,462
[45] Date of Patent: May 4, 1999

[54] METAL LAMINATE GASKET WITH STEPPED SEALING PORTION

[75] Inventor: Tsunekazu Udagawa, Ichikawa, Japan

[73] Assignee: Ishikawa Gasket Co., Ltd., Tokyo, Japan

[21] Appl. No.: 08/893,525

[22] Filed: Jul. 11, 1997

[30] Foreign Application Priority Data

Jul. 19, 1996 [JP] Japan ..................... 8-191105

[51] Int. Cl.$^6$ ..................................................... F02F 11/00
[52] U.S. Cl. ........................................... 277/593; 277/601
[58] Field of Search ..................... 277/590, 591, 277/593, 594, 595, 601

[56] References Cited

U.S. PATENT DOCUMENTS

| 4,739,999 | 4/1988 | Ishii et al. | 277/595 |
| 4,938,488 | 7/1990 | Udagawa et al. | 277/595 |
| 5,120,078 | 6/1992 | Udagawa | 277/591 |
| 5,725,222 | 3/1998 | Kobayashi | 277/594 |

FOREIGN PATENT DOCUMENTS

| 0 440 831 | 8/1991 | European Pat. Off. . |
| 0 518 664 | 12/1992 | European Pat. Off. . |
| 0 590 944 | 4/1994 | European Pat. Off. . |

*Primary Examiner*—Anthony Knight
*Assistant Examiner*—Greg Binda
*Attorney, Agent, or Firm*—Kanesaka & Takeuchi

[57] ABSTRACT

A metal laminate gasket of the invention is formed of first, second and third metal plates. The first metal plate includes a curved portion to define a first hole corresponding to a hole of an engine to be sealed, and a flange extending from the curved portion. The second metal plate is located above a first base portion of the first metal plate, and has a second hole with a diameter greater than a size of the flange. The third metal plate is situated above the second metal plate, and includes an inner portion situated around a third hole under the flange. A stepped portion is formed between the inner portion and a third base portion by bending the third metal plate to have a thickness greater than that of the third metal plate. When the gasket is compressed, the stepped portion is disposed between an outer edge of the flange and an edge of the second hole and provides a surface pressure thereat. The stepped portion securely seals around the hole of the engine outside a main sealing device.

8 Claims, 1 Drawing Sheet

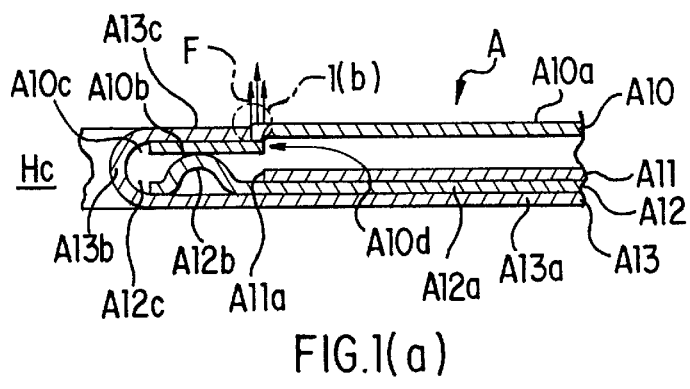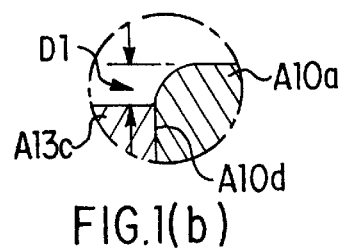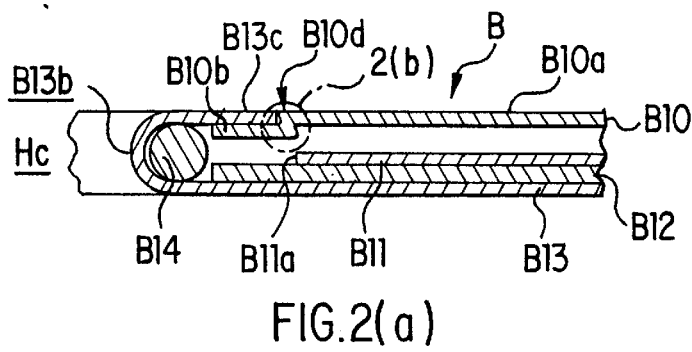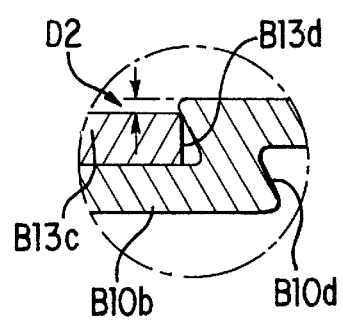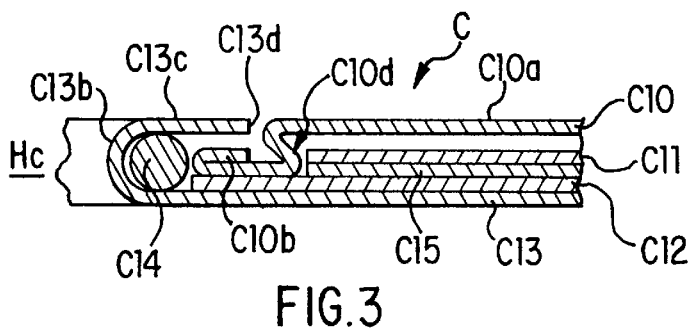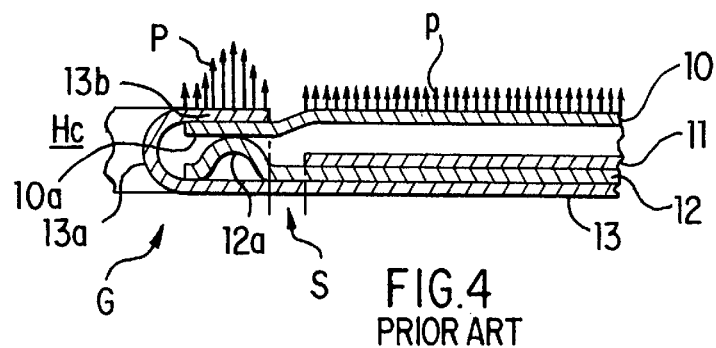

METAL LAMINATE GASKET WITH STEPPED SEALING PORTION

BACKGROUND OF THE INVENTION AND RELATED ART STATEMENT

The present invention relates to a metal laminate gasket with a stepped sealing portion on a metal plate for securely sealing around a hole.

A metal gasket or metal laminate gasket has been used widely since the metal gasket is strong against high temperature and pressure.

In one type of a metal laminate gasket formed of three or more metal plates, one metal plate with a curved portion and another metal plate with an inner portion are assembled together to prevent fluid from entering between the plates, such as U.S. Pat. No. 4,728,110 and No. 4,776,601. FIG. 4 shows this kind of a gasket.

As shown in FIG. 4, the gasket G is formed of an upper plate 10 with an inner portion 10a, a middle or surface pressure regulating plate 11, a middle plate 12 with a bead 12a, and a lower plate 13 with a curved portion 13a and a flange 13b. A space S is formed laterally between the flange 13b and the middle plate 11. When the gasket G is tightened, apart of the upper plate 10 can be bent easily so that the inner portion 10a is located under the flange 13b.

When the gasket G is situated between a cylinder head and a cylinder block (both not shown) and is tightened, the gasket G provides a surface pressure P by the bead 12a near a cylinder bore Hc, i.e. main sealing portion, and a surface pressure p away from the cylinder bore. The surface pressure p is less than the surface pressure P.

In the space S, a number of the plates for constituting the gasket is reduced, and a part of the upper plate 10 is inclined to be located under the flange 13b. Therefore, when the gasket G is tightened, a surface pressure is not formed on the space S.

In this situation, if there is a deficiency in one part of the main sealing portion around the cylinder bore Hc, a fluid leaks from that part and flows along the space S. If the surface pressure p is not even throughout the entire area, the fluid in the space S flows into a lower surface pressure portion and spreads over the gasket.

The present invention has been made in view of the above situation, and an object of the invention is to provide a metal laminate gasket, which can provide a surface pressure continuously at a main sealing portion and a vicinity thereof to securely seal around a hole to be sealed.

Another object of the invention is to provide a metal laminate gasket as stated above, which can provide a surface pressure outside the main sealing portion evenly without forming a non-surface pressure area.

A further object of the invention is to provide a metal laminate gasket as stated above, which can be easily and economically formed.

Further objects and advantages of the invention will be apparent from the following description of the invention.

SUMMARY OF THE INVENTION

A metal laminate gasket of the invention is used for an internal combustion engine, especially as a cylinder head gasket. The gasket is basically formed of first, second and third metal plates laminated together.

The first metal plate includes a first base portion extending substantially throughout an entire area of the gasket, a curved portion extending from the first base portion to define a first hole corresponding to a hole of the engine to be sealed, and a flange extending from the curved portion and located above the first base portion. The second metal plate includes a second base portion situated above the first base portion and a second hole with a diameter greater than a size of the flange. The third metal plate includes a third base portion situated above the second base portion, a third hole, and an inner portion situated around the third hole under the flange.

In the invention, a stepped portion is formed in the third metal plate between the inner portion and the third base portion, which is formed by bending the third metal plate to have a thickness or height greater than that of the third metal plate. When the gasket is compressed, the stepped portion is disposed between an outer edge of the flange and an edge of the second hole and provides a surface pressure to securely seal around the hole of the engine outside the flange.

In the invention, main sealing means is disposed between the flange and the first base portion outside the curved portion. When the gasket is compressed, the main sealing is compressed around the hole to thereby securely seal around the hole. In the invention, since the stepped portion provides the surface pressure immediately outside the flange, even if a fluid leaks through a part of the flange, the stepped portion surely prevents the leakage through the part of the flange. In the conventional gasket, this kind of leakage can not be stopped, but the stepped portion of the invention can stop the leakage.

The main sealing means may be a seal ring situated adjacent to the curved portion between the flange and the first base portion. Also, the main sealing means may be a bead formed on a fourth plate laminated on the first base portion and located between the first base portion and the flange.

The third metal plate has an outer surface at a side opposite to the second metal plate, wherein an angle of the outer surface between the inner portion and the stepped portion is at most 90 degrees. Namely, the stepped portion is formed vertically or inclined at an acute angle relative to the inner portion.

The thickness or height of the stepped portion is greater than the thickness of the flange. When the gasket is compressed, the stepped portion contacts the outer edge of the flange and the edge of the second hole. Thus, the flange extends to the third base portion without a gap, and the stepped portion surely provides the surface pressure immediately outside the flange.

The inner portion of the third metal plate may be bent to form a solid portion thereat In this case, the stepped portion has a height greater than that of the solid portion to provide the surface pressure thereat. In the invention, the fluid leakage around the hole is surely prevented.

BRIEF DESCRIPTION OF THE DRAWINGS

FIG. 1(a) is a cross sectional view at a cylinder bore of a first embodiment of a metal laminate gasket of the invention;

FIG. 1(b) is an enlarged view at 1(b) shown in FIG. 1(a);

FIG. 2(a) is a cross sectional view, similar to FIG. 1(a), of a second embodiment of a metal laminate gasket of the invention;

FIG. 2(b) is an enlarged view at 2(b) shown in FIG. 2(a);

FIG. 3 is a cross sectional view, similar to FIG. 1(a), of a third embodiment of a metal laminate gasket of the invention; and FIG. 4 is a cross sectional view, similar to FIG. 1(a), of a conventional metal laminate gasket.

DETAILED DESCRIPTION OF PREFERRED EMBODIMENT

FIGS. 1(a) and 1(b) show a first embodiment A of a metal laminate gasket of the invention The gasket A is a cylinder head gasket and includes a plurality of cylinder bores Hc, water holes, oil holes, bolt holes and so on, as in the conventional gasket. Since the general structure and operation of the gasket A are the same as those of the conventional gasket, the general structure of the gasket A is not explained herein. The water holes, oil holes, bolt holes and so on are formed, as in the conventional gasket The gasket A is formed of four plates, i.e. an upper plate A10, a thin surface pressure regulating plate A11, a middle plate A12, and a lower plate A13, similar to the conventional gasket G. The plates extend substantially throughout the entire area of the gasket.

The upper plate A10 includes a base portion A10a, an inner portion A10b around a hole A10c, and a stepped portion A10d situated between the base portion A10a and the inner portion A10b.

The surface pressure regulating plate A11 is located under the base portion A10a, and includes a hole A11a greater than the size of the inner portion A10b. When the gasket A is assembled, the inner portion A10b and the stepped portion A10d are located inside the hole A11a.

The middle plate A12 includes a base portion A12a located under the surface pressure regulating plate A11, and a bead A12b around a hole A12c. The bead A12b is located under the inner portion A10b.

The lower plate A13 includes a base portion A13a located under the middle plate A12, a curved portion A13b to define the cylinder bore Hc, and a flange A13c located above the inner portion A10b.

In the gasket A, the stepped portion A10d is formed by simply bending the upper plate A10 in the vertical direction. The height of the stepped portion A10d is greater than the thickness of the flange A13c. Thus, the upper surface of the base portion A10a is located for a distance D1 above an upper surface of the flange A13c.

In the gasket A, also, the surface pressure regulating plate A11 is selected such that the total thickness of the gasket A at the surface pressure regulation plate, i.e. base portion A10a, surface pressure regulation plate A11, base portion A12a, base portion A13a, is slightly less than the total thickness at the flange, i.e. flange A13c, inner portion A10b, bead A12b and base portion A13a.

When the gasket A is situated between a cylinder head and a cylinder block (both not shown) and is tightened, the curved portion A13b and the bead A12b are compressed. Also, the stepped portion A10d disposed outside the flange A13c is located inside the hole A11a, and is compressed thereat. The stepped portion A10d abuts against the edge of the hole A11a and the edge of the flange A13c to close the gap therebetween. The bead A12b provides a surface pressure P to mainly seal around the cylinder bore Hc, while the stepped portion A10d provides a surface pressure F thereat outside the flange A13c.

In the gasket A, the surface pressures P and p (FIG. 4) are formed similar to the conventional gasket In addition, the surface pressure F is formed at the stepped portion A11d between the surface pressures P and p. Since there is no surface pressure blank portion in the gasket A, even if a gas leaks at the flange A13c above a main sealing portion, the gas leakage is surely prevented at the stepped portion A10d.

FIGS. 2(a) and 2(b) show a second embodiment B of a metal laminate gasket of the invention The gasket B is formed of an upper plate B10 having an inner portion B10b and a stepped portion B10d, a surface pressure regulating plate B11, a middle plate B12, and a lower plate B13 having a curved portion B13b and a flange B13c, similar to the gasket A. In the gasket B, the middle plate B12 does not have a bead, but a wire ring B14 is formed outside the curved portion B13b to provide a surface pressure thereat Also, the shape of the stepped portion B10d is slightly different from that of the stepped portion A10d. Namely, the stepped portion B10d is inclined inwardly such that outer surfaces of the stepped portion B10d and the flange B13c form an acute angle, i.e. Z-shape in a cross section. Also, a distance D2 is formed between an outer surface of a base portion B10a and an outer surface of the flange B13c.

In the gasket B, since the stepped portion B10d is inclined, when the stepped portion B10d is compressed, the stepped portion B10d is pushed laterally between an edge B13d of the flange B13c and an edge of the hole B11a in addition to vertical compression. Thus, the space between the edges can be securely sealed The gasket B operates as in the gasket A.

FIG. 3 shows a third embodiment C of a metal laminate gasket of the invention. The gasket C is formed of an upper plate C10 having a base portion C10a, on inner portion C10b and a stepped portion C10d, a surface pressure regulating plate C11, a middle plate C12, a lower plate C13 having a curved portion C13b and a flange C13c, and a wire ring C14, similar to the gasket B. In the gasket C, another surface pressure regulation plate C15 is situated between the plates C11, C12.

In the gasket C, the inner portion C10b is turned to have a double thickness, or a solid portion. Also, the height of the stepped portion C10d is increased more than the thickness of the inner portion C10b. When the gasket C is compressed, an edge C13d abuts against an upper end of the stepped portion C10d, and an edge of the plate C15 abuts against a lower end of the stepped portion C10d. As a result, there is no lateral space between the flange and the surface pressure regulating plate. Also, the stepped portion forms a surface pressure thereat to seal around the cylinder bore.

In the present invention, an upper plate includes a stepped portion to be located adjacent to a flange, which is a part of a lower plate and situated adjacent to a base portion of the upper plate. When the gasket is tightened, the stepped portion provides a surface pressure between the flange and the base portion. Therefore, even if a gas leaks at a main sealing portion, the stepped portion prevents the gas leakage. The gasket of the invention can securely and stably seal around a hole.

While the invention has been explained with reference to the specific embodiments of the invention, the explanation is illustrative and the invention is limited only by the appended claims.

What is claimed is:

1. A metal laminate gasket for an internal combustion engine having a hole to be sealed, comprising:

a first metal plate having a first base portion extending substantially throughout an entire area of the gasket, a curved portion extending from the first base portion to define a first hole corresponding to the hole of the engine, and a flange extending from the curved portion and located above the first base portion;

a second metal plate having a second base portion situated above the first base portion and a second hole with a diameter greater than a size of the flange; and a third metal plate having a third base portion situated above the second base portion, a third hole, an inner portion situated around the third hole and located under the flange, and a stepped portion formed between the inner portion and the third base portion by bending the third metal plate, said stepped portion having a height greater than a thickness of the third metal plate and a thickness of the flange so that when the gasket is assembled, the stepped portion is disposed between an outer edge of the flange and an inner edge of the second metal plate around the second hole, and when the gasket is compressed, the stepped portion provides a surface pressure thereat to thereby form a continuous surface pressure from the flange to the third base portion of the third metal plate through the stepped portion to securely seal around the hole of the engine.

2. A metal laminate gasket according to claim 1, wherein said third metal plate has an outer surface at a side opposite to the second metal plate, an angle of the outer surface between the inner portion and the stepped portion being at most 90 degrees.

3. A metal laminate gasket according to claim 2, wherein said stepped portion contacts the outer edge of the flange and the inner edge of the second hole when the gasket is compressed.

4. A metal laminate gasket according to claim 3, further comprising a fourth metal plate situated between the first base portion and the second metal plate, said fourth metal plate having a fourth hole and a bead around the fourth hole, said bead being located between the first base portion and the flange to provide a surface pressure around the hole of the engine.

5. A metal laminate gasket according to claim 1, wherein a total thickness of plate portions at the flange is greater than a total thickness of plate portions at the second base portion.

6. A metal laminate gasket according to claim 5, wherein the plate portions at the flange include the flange, the inner portion of the third metal plate and the first base portion, and the plate portions at the second base portion include the first, second and third base portions.

7. A metal laminate gasket for an internal combustion engine having a hole to be sealed, comprising:
- a first metal plate having a first base portion extending substantially throughout an entire area of the gasket, a curved portion extending from the first base portion to define a first hole corresponding to the hole of the engine, and a flange extending from the curved portion and located above the first base portion;
- a second metal plate having a second base portion situated above the first base portion and a second hole with a diameter greater than a size of the flange; and
- a third metal plate including a third base portion situated above the second base portion, a third hole, an inner portion situated around the third hole and located under the flange, said inner portion being bent to form a solid portion thereat, an outer surface at a side opposite to the second metal plate, and a stepped portion formed between the inner portion and the third base portion by bending the third metal plate, said stepped portion having a height greater than a thickness of the flange and a height of the solid portion, an angle of the outer surface between the inner portion and the stepped portion being at most 90 degrees so that when the gasket is compressed, the stepped portion is disposed between an outer edge of the flange and an inner edge of the second hole to contact thereto and provides a surface pressure thereat to securely seal around the hole of the engine.

8. A metal laminate gasket according to claim 7, further comprising a seal ring situated adjacent to the curved portion between the flange and the first base portion to provide a surface pressure around the hole of the engine.

* * * * *

UNITED STATES PATENT AND TRADEMARK OFFICE
CERTIFICATE OF CORRECTION

PATENT NO.  : 5,899,462
DATED       : May 4, 1999
INVENTOR(S) : Tsunekazu Udagawa It is certified that error appears in the above-indentified patent and that said Letters Patent is hereby corrected as shown below:

```
In column 3, line  4, after "invention" add period;
             line 60, after "gasket" add period;
             line 61, change "A11d" to --A10d--;
             line 67, after "invention" add period;

In column 4, line  7, after "thereat" add period;
             line 19, after "sealed" add period;
             line 23, change "on" to --an--.
```

Signed and Sealed this

Thirty-first Day of August, 1999

*Attest:*

Q. TODD DICKINSON

*Attesting Officer*  Acting Commissioner of Patents and Trademarks